Feb. 25, 1969 P. H. MOREL 3,430,114
FIELD EFFECT TRANSISTOR IN AN INTEGRATED CIRCUIT HAVING
AN EMBEDDED GRID
Filed Feb. 14, 1966 Sheet 1 of 5

INVENTOR
PHILIPPE H. MOREL
BY Frank A. Lukasik
ATTORNEY

INVENTOR
PHILIPPE H. MOREL
BY
Frank A. Lukasik
ATTORNEY

INVENTOR
PHILIPPE H. MOREL
BY Frank A. Lukasik
ATTORNEY

INVENTOR
PHILIPPE H. MOREL
BY Frank A. Lukasik
ATTORNEY

INVENTOR
PHILIPPE H. MOREL
BY Frank A. Lukasik
ATTORNEY 3,430,114

FIELD EFFECT TRANSISTOR IN AN INTEGRATED CIRCUIT HAVING AN EMBEDDED GRID

Philippe H. Morel, Paris, France, assignor, by mesne assignments, to the United States of America as represented by the Secretary of the Navy Filed Feb. 14, 1966, Ser. No. 528,006
Claims priority, application France, Feb. 16, 1965, 5,749
U.S. Cl. 317—235 2 Claims
Int. Cl. H01l *11/14*

ABSTRACT OF THE DISCLOSURE

The transistor is produced from an n-type silicon monolithic wafer having slots etched therein and subsequently coated with an oxide and filled with a polycrystalline silicon which is then ground to surface the polycrystalline silicon and oxide. By successive steps of masking and diffusion a p-type strip is diffused on the surface in the mid-section of the wafer to form an embedded grid with a drain (anode) and source (cathode) electrode on either side of the p-type strip. Contacts are attached to complete the transistor.

The present invention relates to semiconductor integrated circuits. More particularly, the invention relates to methods for producing a field effect device, and the field effect device manufactured by this method whose components are insulated by an oxide layer and which is part of an integrated circuit.

Methods of manufacturing semiconductor integrated circuits in which the circuit components are insulated by silicon oxide have been previously known. In the prior art method, deep slots which border the insulated regions on which components will be formed are engraved on one face of a single crystal silicon slab, then covered by an oxide layer particularly covering the engraved face and walls of the slots. A polycrystalline silicon deposit of a thickness comparable with that of the original single crystal slab is then produced on this face. Finally, the other face of the slab is ground to remove the excess single crystal silicon thereby causing the insulating slots to appear on the surface. The slab then has monocrystalline silicon areas insulated from each other whereby circuit components, such as semiconductors, can be formed by performing certain operations which are well known in the semiconductor art.

The general purpose of this invention is to provide an improved method for manufacturing an integrated, completely embedded grid, semiconductor device which embraces all of the advantages of similarly employed prior art devices and possesses none of the aforedescribed disadvantages.

The device which may be formed by practicing the method of this invention functions according to the principle defined in U.S. Patent No. 2,930,950 for a gridistor. The gridistor is actually, by its structure, a fusion of what has been defined as a field effect transistor and analogue transistor, combining their advantages while at the same time obviating their disadvantages. The gridistor functions on the principle of centripetal striction, having a multichannel structure. It achieves this structure through the use of an embedded grid. In addition, the gridistor introduced a new concept in the operating process of field effect devices, namely, the process of current saturation which is different from recently developed concepts. These concepts were defined by S. Teszner and R. Gicquel in "Proceedings of the IEEE," vol. 52, No. 12, December 1964.

The voltage of complete striction, and likewise the voltage ensuring the saturation of the anode current, are derived by field effect. They are therefore dependent on the opening of the meshes of the grid and may be low for a convenient resistivity of the semiconductor. Conversely, the maintenance of the saturation up to the relatively high anode voltages, which is a necessary condition to obtain high output power, is only possible because of the development of space charges between the grid and the anode. This is the process very similar to that occurring in a vacuum tube (and, in principle, in an anolog transistor) and it is conditioned by the semiconductor interval grid-anode.

The variations of the characterisics of the gridistor, by reason of the geometry of its structure, are similar to those of thermionic tubes, particularly the transconductance, which varies in principle with the grid-wire spacing. Also, the transconductance increases with the dimensions according to the proportion of the square rather than by linear proportion as with other field effect devices. Difficulties of building a multichannel structure with a common base and gate have delayed its application to the field of telecommunications, particularly at high frequency. The development of photolithographic techniques, epitaxial deposition and the use of the method of this invention have resolved most of the difficulties.

An object of the invention is to provide an improved semiconductor.

Another object is to provide an improved method of manufacturing a semiconductor.

A further object is to provide an improved field effect semiconductor device which has an embedded grid.

A still further object is to provide semiconductor integrated circuits of the type in which the circuit components are insulated by an oxide layer.

Other objects and advantages of this invention will become apparent to those skilled in the art as the disclosure is made in the following description of a preferred embodiment of the invention as illustrated in the accompanying drawings in which:

FIGURE 1 is a front or end view and FIG. 2 is a side view of a silicon wafer in the first step of manufacture of this invention.

FIGURES 3–6 inclusive are, in the same manner as FIGS. 1 and 2 front and end and side views of the wafer of FIGS. 1 and 2 undergoing various treatments in accordance with the teachings of this invention.

FIGS. 7–10 inclusive, are end and side, alternatively in succession, views in section of the wafer in FIG. 1 undergoing various treatments in accordance with the teachings of a first embodiment of this invention.

Figure 1:
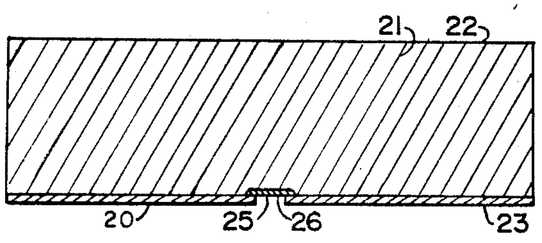
Figure 13:
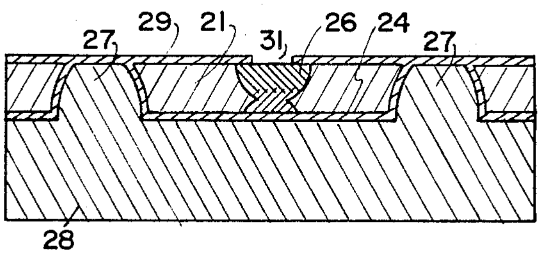
Figure 14:
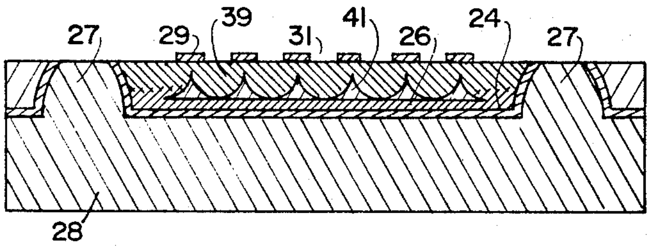
Figure 15:
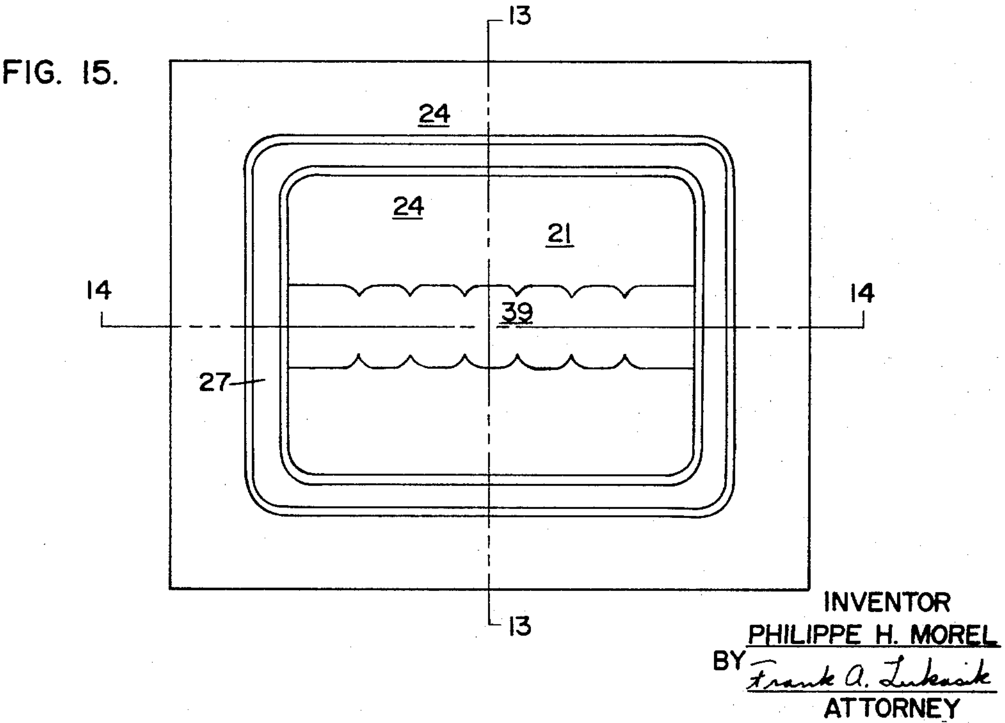

FIGURES 13–15 inclusive are end, side and top views, respectively, showing the wafer in FIG. 1 undergoing various treatments in accordance with the teachings of a second embodiment of this invention.

Referring now to the drawings, wherein like reference characters designate like or corresponding parts throughout the several views, there is shown in FIG. 1 a silicon wafer 21 of n-type semiconductivity. The wafer 21 may be prepared by any one of the methods known to those skilled in the art. The wafer 21 comprises a top surface 22 and a bottom surface 23.

It will be appreciated that the sizes and proportions shown in the drawings are greatly exaggerated for purposes of clarity and facility of explanation. Actually, typical dimensions and characteristics may be as follows: homogeneous doped, n-type, resistivity from 1 to 10Ω× cm. (corresponding to a number of donor impurities of $4.10^{14}$ atoms per $cm.^3$ for 10Ω), thickness from 100 to 200μ. N-type conductivity may be established by "doping" with phosphorous, arsenic or antimony for example.

Figure 2:
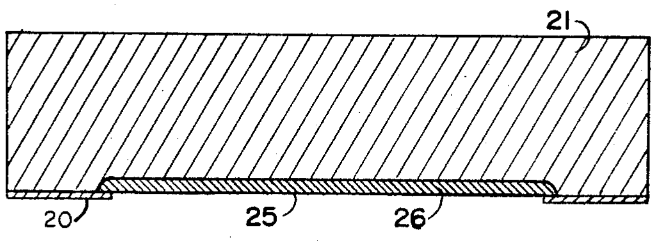

With reference to FIGS. 1 and 2, there is illustrated an n-type single crystal wafer 21 which will be converted into an integrated circuit containing one or several field effect devices produced according to the method of this invention. An oxide mask 20 having a slot-shaped opening 25 is formed on bottom surface 23 by a known method of masking. For example, thermal oxydization, effected at about 1,000° C. for approximately one and one-half hours under water steam atmosphere will provide an oxide layer with a thickness of 0.5μ.

A p-type zone 26 is obtained in the slot 25, which was created in oxide mask 20 by a well known process. The p-type zone 26 may be obtained by diffusion of boron. During grid diffusion it is also necessary to control the progression of the diffusion front.

Figure 3:
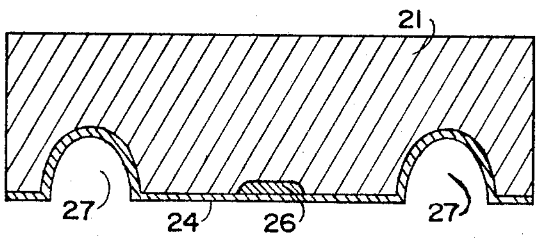
Figure 4:
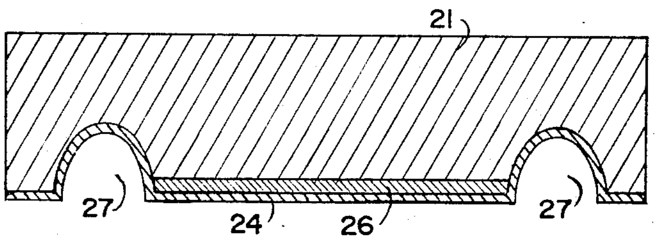

Bottom surface 23 of the n-type wafer 21 is suitably masked with, for example, an organic wax and the areas to be etched are exposed. In FIGS. 3 and 4, the amount of material removed by etching, thus forming slot 27, has been exaggerated for purposes of clarity. The etchant employed may be any suitable reagent known to those skilled in the art for etching silicon, for example, a mixture of nitric acid, hydrofluoric acid and acetic acid.

The surface of slot 27 which was created during the process of etching, is then coated with an oxide layer 24 as previously mentioned.

Figure 5:
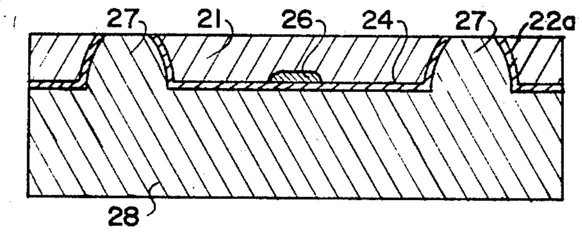
Figure 6:
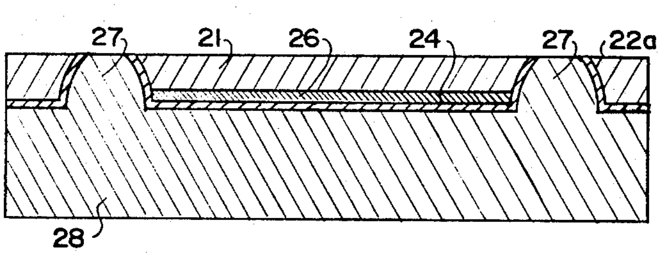

Referring to FIGS. 5 and 6, a layer of polycrystalline silicon 28, comparable in thickness to the layer of n-type single crystal silicon slab 21, is produced on the oxide layer 24 on the surface of slot 27 of the wafer by any well known method, for example, the pyrolyne technique, i.e., chemical deposit at high temperature, starting from silicon tetrachloride.

Top surface 22 and a substantial portion of n-type single crystal silicon wafer 21 is then removed. The excess is removed by, for example, grinding or other suitable process until the polycrystalline silicon 28 in slots 27 appear on what now becomes the top surface **22*a***, thereby obtaining insulated zones of single crystal silicon.

Figure 7:
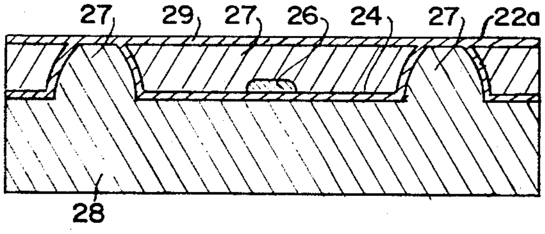
Figure 8:
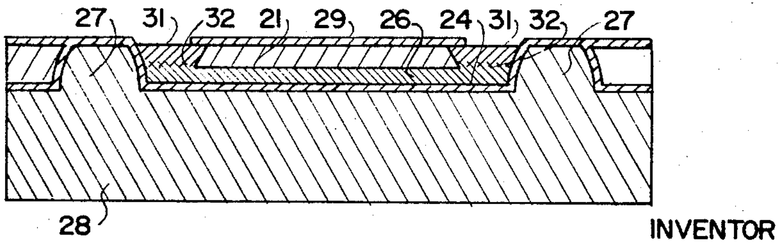

Referring to FIGS. 7 and 8, top surface **22*a* is suitably masked, and an oxide coating 29 containing appropriate slots 31, is produced in the aforementioned manner. Through the slots 31, an impurity is diffused in the aforementioned manner, to give p-type areas 32 which form a merger with the ends of p-type strip 26**.

Figure 9:
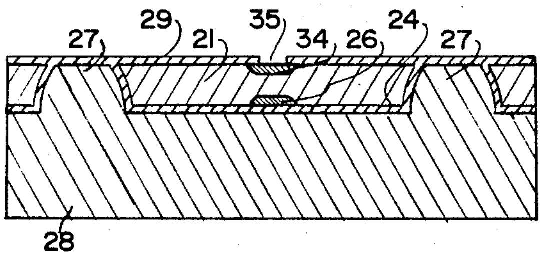
Figure 10:
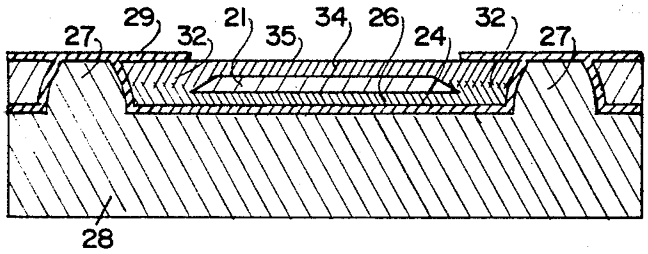
Figure 11:
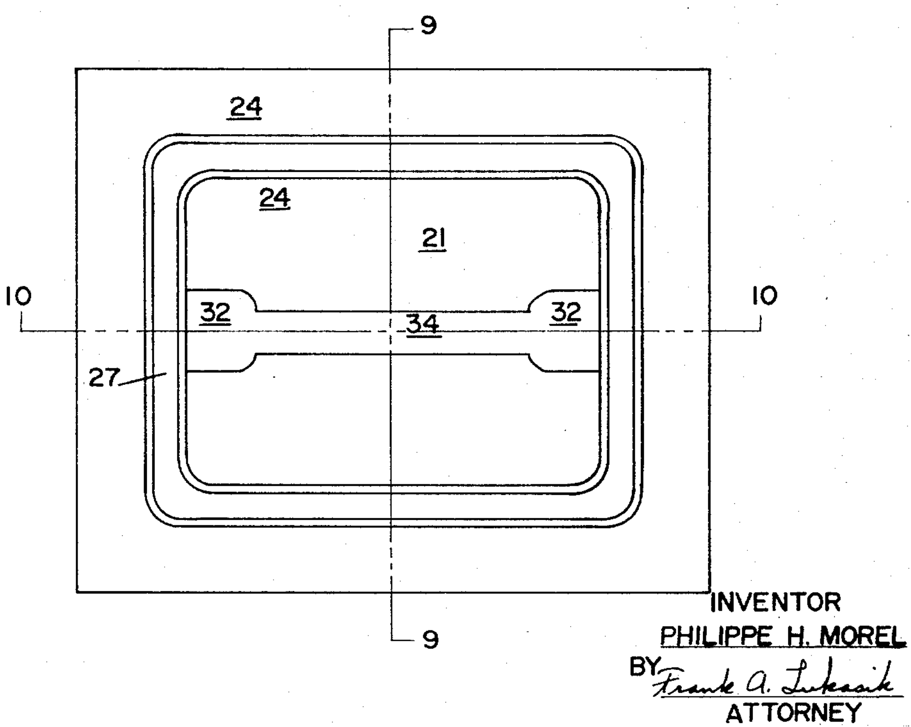
FIG. 11 is a top view of the wafer in FIG. 1.

With reference to FIGS. 9 and 10, an oxide coating containing suitably masked slot 35 is shown. Directly above the p-type strip 26, a second p-type strip 34 is formed by the aforementioned process, through the slot 35. With reference to FIG. 11, there is illustrated a top view of the slab shown in section in FIGS. 9 and 10, the superficial oxide coating 29, for reasons of clarity, not being shown.

Figure 12:
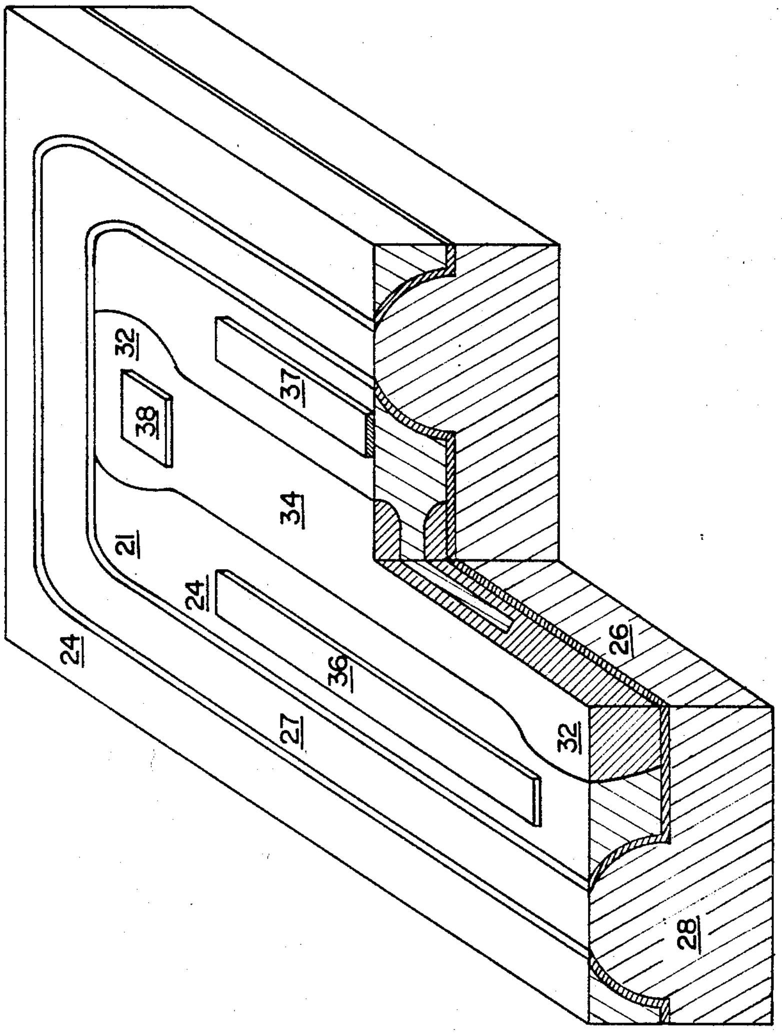
FIG. 12 is a perspective view, partially in section, of a first embodiment of this invention.

With reference to FIG. 12, the semiconductor device of FIGS. 1–11 is illustrated in perspective, partially cutaway, with the superficial oxide layer 29 not shown. The source electrode 36, the drain electrode 37 and the input electrode 38 are produced by evaporating aluminum. The aluminum reacts toward the silicon as an impurity of the p-type. Thus, were this aluminum deposit to be applied upon the silicon wafer, a rectifying contact would be obtained. The aluminum deposit must therefore be applied on an n-area as to obtain a contact without any junction.

In another form of manufacture, not shown in the figures, the p-type zone 26 may be in the shape of a comb, thus producing a more powerful device.

Referring to FIGS. 13–15, there is illustrated a device made in accordance with a second embodiment of this invention. Practicing the steps of this method will produce a field effect device containing multiple conductor channels. The primary stages in the manufacture of this device are identical to the steps shown in FIGS. 1 through 6.

With reference to FIGS. 13 and 14 there are illustrated the succeeding steps of the method of this invention corresponding to the steps illustrated in FIGS. 9 and 10 for the first embodiment of this device. Through an oxide mask, not shown in FIG. 15, for clarity, located above the p-type zone 26, localized diffusions 39 join together in the upper part and reach the p-type zone 26 to produce parallel channels of n-type material 41.

The following example is illustrative of the practice of this invention:

EXAMPLE

A flat wafer of a n-type single crystal silicon, phosphorous doped, resistivity from 9.5 to 11.5Ω cm. suitably masked to form slots in the form of a strip or comb, was disposed in a diffusion furnace. The diffusion furnace was at a temperature of about 1,000° C. and had a water steam atmosphere. An oxide layer with a thickness of 0.5μ was provided thereafter exposing the wafer to the heated atmosphere for one and one half hours. Through the slot (slots) an impurity was diffused in the semiconductor wafer to form an area (areas) of the opposite type of conductivity to the first. The impurity utilized is $B_2O_3$ heated at 1,000° C. The carrying gas is argon (output 700 cc./min.) containing approximately 300 p.p.m. water steam. The wafer was brought up to 1,120° C. for one and one half hours. The grid diffusion was obtained in a furnace at a higher temperature not comprising the $B_2O_3$ impurity source, and in an oxydizing atmosphere to ensure the passivation of the junction. The temperature of the oven was 1,150° C. for eight hours. The structure is that illustrated in FIGS. 1 and 2.

The bottom surface of the n-type layer was masked with an organic wax and was etched with an etchant comprised of nitric acid, hydrofluoric acid, acetic acid and bromine (CP4). Thereafter, the newly formed surface was coated with an oxide layer, covering the surface as well as the newly formed grooves. The structure is that illustrated in FIGS. 3 and 4.

On the surface having the new oxide coating and the etched grooves, a thick deposit of polycrystalline silicon was produced. This deposit filled the slots and formed over the oxide, a layer of thickness comparable to the single crystal wafer used as the starting material. The wafer was disposed in an epitaxial reactor which had a silicon tetrachloride atmosphere until the desired thickness was obtained. The structure is not illustrated.

Thereafter, a substantial amount of the initial slab of single crystal silicon, was removed by grinding. Starting with the top surface this process was continued until the bottom of the slots filled with polycrystalline silicon became flush with the ground surface. The new top surface was suitably masked with an oxide coating containing appropriate windows was produced. The structure is that illustrated in FIGS. 7 and 8.

A second p-type area was formed in the slots in the previously formed oxide mask. The diffusion process was continued until the second p-type area merged with the ends of the first p-type area. A second p-type strip was also formed directly above the first p-type strip by the aforementioned process. The structure is that illustrated in FIGS. 9 and 10.

To materialize the anode and cathode contacts, windows were made in the oxide and the wafer was disposed in a diffusion furnance for three minutes at 1,000° C. in a vapor containing $P_2O_5$. The aluminum contacts were obtained by an aluminum deposit under vacuum and aluminum diffusion in silicon. The aluminum was thus deposited only on the anode and cathode areas and the risk of having injecting contacts was thereby suppressed.

The procedure of the example can be repeated to prepare devices comprised of any semiconductor material and particularly those comprised of germanium, silicon carbide, stoichiometric compounds of elements of Group III and Group V of the Periodic Table, for example, indium arsenide, indium antimonide, gallium arsenide, and gallium antimonide, and stoichiometric compounds of Group II and VI of the Periodic Table, for example cadmium sulphide.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. A field effect device comprising:
at least one monocrystalline slab of a first type semiconductor material having a top, bottom and side surfaces;
an oxide layer formed on said bottom and side surfaces;
a polycrystalline silicon deposit in contact with said oxide layer;

a continuous second type semiconductor strip introduced in said top, bottom and side surfaces of said slab by diffusion to form to least one embedded grid completely surrounding at least one conducting channel in said slab;
and three electrodes one each applied to said second type strip and to said slab on either side of said second type strip.

2. A field effect device as set forth in claim 1 wherein:
said first type semiconductor material is of the N-type; and said second type semiconductor strip is of the P-type.

References Cited

UNITED STATES PATENTS 3,290,753 12/1966 Chang .............. 29—25.3

JOHN W. HUCKETT, *Primary Examiner.*

M. EDLOW, *Assistant Examiner.*